US008400945B2

(12) United States Patent
Barnes et al.

(10) Patent No.: US 8,400,945 B2
(45) Date of Patent: Mar. 19, 2013

(54) TRANSIT PREVENTION IN HUB-AND-SPOKE TOPOLOGIES USING LINK STATE PROTOCOLS

(75) Inventors: Michael Barnes, San Mateo, CA (US); Alvaro E. Retana, Raleigh, NC (US); Paul Wells, Eden Prairie, MN (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 12/207,624

(22) Filed: Sep. 10, 2008

(65) Prior Publication Data

US 2010/0061246 A1 Mar. 11, 2010

(51) Int. Cl.
*H04L 12/28* (2006.01)

(52) U.S. Cl. .......................... 370/256; 370/236; 370/408

(58) Field of Classification Search .......... 370/216–228, 370/229, 235, 236, 238, 254–256, 351, 356, 370/389, 408, 400
See application file for complete search history.

(56) References Cited

U.S. PATENT DOCUMENTS

| 7,120,120 | B2* | 10/2006 | Guerin et al. | 370/238 |
|---|---|---|---|---|
| 7,330,435 | B2* | 2/2008 | Guerin et al. | 370/238 |
| 7,334,047 | B1 | 2/2008 | Pillay-Esnault | |
| 7,362,709 | B1* | 4/2008 | Hui et al. | 370/237 |
| 7,423,995 | B1* | 9/2008 | Elliott et al. | 370/332 |
| 7,468,956 | B1* | 12/2008 | Leelanivas et al. | 370/255 |
| 7,848,335 | B1* | 12/2010 | Kang et al. | 370/401 |
| 2006/0029032 | A1 | 2/2006 | Allan et al. | |
| 2007/0206597 | A1* | 9/2007 | Asati et al. | 370/392 |
| 2007/0245034 | A1 | 10/2007 | Retana et al. | |
| 2007/0255812 | A1 | 11/2007 | Mirtorabi et al. | |
| 2007/0263592 | A1* | 11/2007 | Agarwal et al. | 370/351 |
| 2009/0003211 | A1* | 1/2009 | Akyamac et al. | 370/235 |
| 2009/0003367 | A1* | 1/2009 | Hei et al. | 370/408 |
| 2009/0296714 | A1* | 12/2009 | Gerber et al. | 370/395.31 |

* cited by examiner

*Primary Examiner* — Christopher Grey
(74) *Attorney, Agent, or Firm* — Patent Capital Group

(57) ABSTRACT

In one embodiment, a method and apparatus of controlling transmission of data packets in a communications network includes designating all networking devices in a portion of the communications network as either hubs or spokes, communicating a link-state advertisement to each connected hub and spoke in the portion of the communications network, computing a shortest path tree at all the hubs and the spokes based on the link-state advertisement, the computing including truncating the shortest path tree at the hubs only for links leading from the spoke to the hub, creating a routing table at each of the hub and the spoke based on the truncated shortest path tree, and transmitting the data packets in the communications network based on the link-state advertisement. The shortest path tree includes all data transmission routes in the tree except links leading from a spoke to a hub.

15 Claims, 3 Drawing Sheets

TRANSIT PREVENTION IN HUB-AND-SPOKE TOPOLOGIES USING LINK STATE PROTOCOLS

TECHNICAL FIELD

The embodiments herein generally relate to network communication and, more particularly, to communication in hub-and-spoke network topologies.

BACKGROUND

In typical hub-and-spoke networks it is desirable for the spokes not to be used as transit paths between two hubs. In many networks, this statement is true at all times. A link state protocol maintains a full topology of the nodes in the domain, which means that it will find paths through the spokes if available and use them. Current best practices result in the spokes being used as transit only as a last resort by either adjusting the metrics or providing a link between the hubs.

The existing methods for routing in hub-spoke network topologies avoid using spoke routers in the transit path between hub routers. In general, the occurrence of the spoke routers in the transit path between hub routers is prevented by using a link (physical/logical) between the hubs. This mechanism works until the link goes down.

BRIEF DESCRIPTION OF THE DRAWINGS

The embodiments herein will be better understood from the following detailed description with reference to the drawings, in which.

DESCRIPTION OF EXAMPLE EMBODIMENTS

Figure 1:
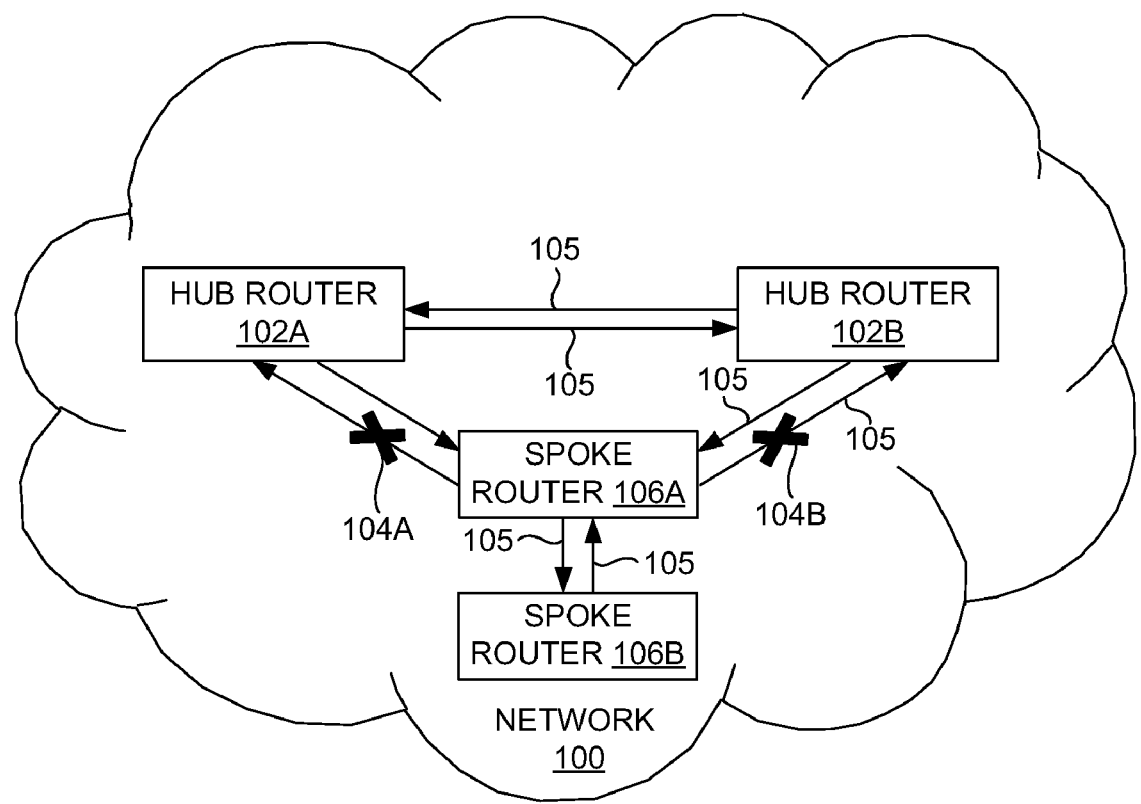
FIG. 1 illustrates a shortest path tree truncation in a hub and spoke network according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Overview

In view of the foregoing, an embodiment herein provides a method of controlling transmission of data packets in a communications network comprising hubs and spokes, wherein the method comprises generating a link-state advertisement; computing a shortest path tree based on the link-state advertisement, wherein the shortest path tree comprises all data transmission routes in the tree except links leading from a spoke to a hub; creating a routing table based on the shortest path tree; and transmitting the data packets in the communications network based on the link-state advertisement, wherein the transmission of the data packets are controlled by instructions provided in the routing table. Preferably, the computing process comprises truncating the shortest path tree only for links leading from the spoke to the hub. The hubs and the spokes may be located in a portion of the communications network. Moreover, the portion of the communications network may comprise an open shortest path first area of the communications network. Preferably, the shortest path tree comprises any of hub-to-hub links; hub-to-spoke links; and spoke-to-spoke links.

Another embodiment provides an apparatus for controlling transmission of data packets in a communications network comprising hubs and spokes, wherein the apparatus comprises means for generating a link-state advertisement; means for computing a shortest path tree based on the link-state advertisement, wherein the shortest path tree comprises all data transmission routes in the tree except links leading from a spoke to a hub; means for creating a routing table based on the shortest path tree; and means for transmitting the data packets in the communications network based on the link-state advertisement, wherein the transmission of the data packets are controlled by instructions provided in the routing table. The apparatus further comprises means for truncating the shortest path tree only for links leading from the spoke to the hub. Additionally, the hubs and the spokes may be located in a portion of the communications network. Moreover, the portion of the communications network may comprise an open shortest path first area of the communications network. Preferably, the shortest path tree comprises any of hub-to-hub links; hub-to-spoke links; spoke-to-spoke links.

Another embodiment provides an apparatus for controlling transmission of data packets in a communications network comprising hubs and spokes, wherein the apparatus comprises a computing module that computes a shortest path tree based on a link-state advertisement, wherein the shortest path tree comprises all data transmission routes in the tree except links leading from a spoke to a hub; a routing table comprising the shortest path tree; and a transmitting module that transmits the data packets in the communications network based on the link-state advertisement, wherein the transmission of the data packets are controlled by instructions provided in the routing table. Preferably, the computing module truncates the shortest path tree only for links leading from the spoke to the hub. Furthermore, the hubs and the spokes may be located in a portion of the communications network. Moreover, the portion of the communications network may comprise an open shortest path first area of the communications network. Preferably, the shortest path tree comprises any of hub-to-hub links; hub-to-spoke links; and spoke-to-spoke links.

Another embodiment provides a method of controlling transmission of data packets in a communications network, and software encoded in one or more computer-readable media and when executed operable to perform the method of controlling transmission of data packets in the communications network. The method includes designating all networking devices in a portion of the communications network as either hubs or spokes, communicating a link-state advertisement to each connected hub and spoke in the portion of the communications network, computing a shortest path tree at all the hubs and the spokes based on the link-state advertisement, the computing process including truncating the shortest path tree at the hubs only for links leading from a spoke to a hub, creating a routing table at each of the hub and the spoke based on the truncated shortest path tree, and transmitting the data packets in the communications network based on the link-state advertisement, wherein the transmission of the data packets are controlled by instructions provided in the routing table. The shortest path tree includes all data transmission routes in the tree except links leading from a spoke to a hub.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Description

The embodiments provide a method, software, and an apparatus for controlling the transmission of data packets in a communications network. The communications network includes a hub and spoke network which prevents transmitting data packets through one or more spokes while routing the data packets among a plurality of hubs even if no direct connection exists between the hubs. Referring now to the drawings, and more particularly to FIGS. 1 through 4 where similar reference characters denote corresponding features consistently throughout the figures, there are shown preferred embodiments.

FIG. 1 illustrates a shortest path tree truncation in a hub and spoke network 100 according to an embodiment herein. A hub and spoke network refers to a point-to-multipoint network in which one or more spoke routers are connected to a hub router. In hub and spoke topologies, each spoke router in a network area may be interconnected to other spoke routers in the network area, but generally each spoke router communicates directly to the hub router in the network area in order to communicate with other spoke routers of the network area. Hub routers from the same network area or different network areas may have one or more spoke routers connected in common to the hub routers.

Routing in a hub-spoke network may be accomplished by employing an Interior Gateway Protocol (IGP), such as an Open Shortest Path First (OSPF) routing protocol. IGPs are routing protocols used by a collection of IP networks and routers that have a common routing policy (i.e., an autonomous system). The OSPF protocol is a link state routing protocol for internetworking and facilitates communications with external networks. Routing is accomplished in the OSPF protocol by each network router (i.e., a hub router or a spoke router) using a routing database. The routing database contains information related to a network area topology (e.g., links between network routers in the network area). The routing database is used by the network routers to create an overall picture of the network area in relationship to routers.

FIG. 1 illustrates a communications network 100 comprising connection nodes. The network 100 shown in FIG. 1 may constitute an entire communications network or merely just one area of a larger communications network. In the context of the embodiments herein, a connection node comprises a networking hardware device. For example, the connection nodes may be embodied as routers, bridges, gateways, firewalls, or switches. In the example embodiment of FIG. 1, the network 100 comprises networking devices 102A, 102B, 106A, 106B, which are interconnected via a communication link 105. In one embodiment, the networking devices comprise hub routers 102A, 102B and spoke routers 106A, 106B.

Hub truncation points are shown as an 'X' 104A, 104B in FIG. 1. These truncation points 104A, 104B represent that portion of the link between the hub routers 102A, 102B and the spoke routers 106A, 106B where the path for data transmission is terminated based on shortest path first (SPF) tree computations. A SPF tree computation is performed using a link-state advertisement (LSA), which is pre-communicated to the hub routers 102A, 102B and the spoke routers 106A, 106B in the hub and spoke network 100.

The communication link 105 may comprise any form of physical media layer, such as an Ethernet, Fiber Distributed Data Interface (FDDI), or High-level Data Link Control (HDLC) serial link and may be a wireless link. The networking devices 102A, 102B, 106A, 106B each comprise a routing processor (not shown) for receiving a set of encrypted data packets (i.e., IP packets) from connected networking devices and routing the data packets to destination devices (such as other connected networking devices). Moreover, the routing processors are each configured for performing the process steps described herein, and may include specific hardware constructed or programmed for performing the process steps described herein, a general-purpose processor operating under program control, or some combination thereof.

A message flow is processed through communication link 105, wherein the message flow contains a unidirectional stream of IP packets (not shown) that are transmitted (based on network-layer addresses and port numbers) between particular pairs of devices (for example, between hub 102A and hub 102B) in the network 100. Alternatively, a message flow may be bi-directional instead of unidirectional, a message flow may be identified at a different protocol layer level than that of transport service access points, or a message flow may be identified responsive to other factors including information in packet headers, packet length, time of packet transmission, or routing conditions on the network 100 (such as relative network congestion or administrative policies with regard to routing and transmission).

The routing databases in the networking devices 102A, 102B, 106A, 106B are updated by exchanging LSA packets between neighboring networking devices 102A, 102B, 106A, 106B. These packets generally include information related to current links of the network routers and are typically transferred periodically and/or in the event of a modification to the network topology. The routing database in the networking devices 102A, 102B, 106A, 106B contain the collection of LSAs received from all networking devices 102A, 102B, 106A, 106B in the same area of the network 100. Because networking devices 102A, 102B, 106A, 106B within the same area of the network 100 share the same information, they have identical routing databases.

Networking devices 102A, 102B, 106A, 106B belonging to one or more network areas share the network area topology information by sending and receiving LSAs across one or more network areas. The routing database is utilized by each networking devices 102A, 102B, 106A, 106B to build a topology view of the network area specific to the networking devices 102A, 102B, 106A, 106B and determine a path for transmitting a message to a destination networking device. The networking devices 102A, 102B, 106A, 106B use the routing database to compute the shortest path tree (SPT) and the resultant shortest path computation is referred to as a shortest path first (SPF).

To determine SPT and SPF, a networking device 102A, 102B, 106A, 106B routes the data to a destination networking device through one or more intermediate network routers. The routing database maintains a full topology of routers in a network area. The transit path for data being routed between two or more hub routers 102A, 102B may include one or more spoke routers 106A, 106B. Hence, in hub-spoke network topologies, a SPT computed by a hub router 102A, 102B may include one or more spoke routers 106A, 106B as intermediate routers.

The data being transmitted between hub routers 102A, 102B includes a large amount of data with a high Quality of Service (QoS) requirement. However, hub-spoke network topologies spoke routers 106A, 106B tend to be able to handle a low amount of data as compared to hub routers 102A, 102B.

The shortest path first (SPF) may include data transmission routes ('H' refers to 'hub' and 'S' refers to 'spoke') (e.g., H-to-H, H-to-S, and S-to-S link types) in the tree except links leading from a spoke to a hub (i.e., not S-to-H link types). In one embodiment, the hub routers 102A, 102B allow H-to-H, H-to-S, and S-to-S link types in the SPF tree and do not allow a S-to-H link. This embodiment provides this protocol to avoid S-to-H transmission because typically, the hub-spoke links are sized only to handle the amount of traffic that is normally exchanged with a particular spoke. Thus, compared to the links between hubs 102A, 102B in the core of the network 100, the spoke routers 106A, 106B have a relatively low bandwidth. If the failure of a core link were to cause a large volume of traffic to be sent via a spoke (106A or 106B), it would quickly overwhelm the hub-spoke links (and perhaps the spoke router (106A or 106B)) causing many packets to be dropped. Thus, though the network 100 would still appear to be fully connected, it would in fact be very unreliable. Also, because of the route preference rules in OSPF, the existence of the route via a spoke (106A or 106B) might prevent a better (higher bandwidth) backup path in the core from being used. In another embodiment, the SPF tree computation on the spoke routers 106A, 106B is unmodified and all four link types are considered.

The hub routers 102A, 102B may not compute routes using links leading from a spoke router to a hub router. The shortest path tree is truncated at the hub routers only for the links leading from a spoke router to a hub router. For example, the hub routers 102A, 102B may truncate a shortest SPF tree at the hub truncation points 'X' 104A, 104B between hub router 102A and spoke router 106A and between hub router 102B and spoke router 106A. The spoke routers 106A, 106B are excluded from the shortest path tree and become a non-transit link for data transmission according to one embodiment.

Figure 2:
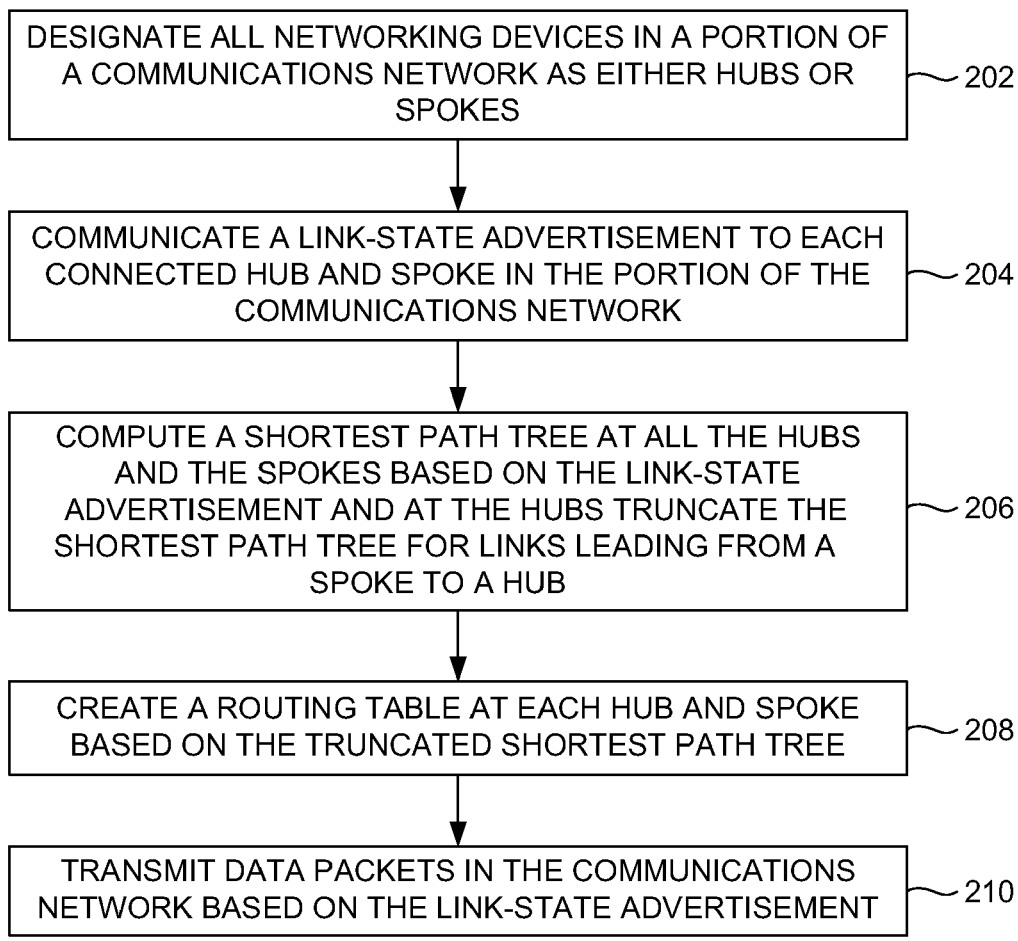
FIG. 2 is a flow diagram illustrating a method of transmitting data packets in a communications network according to an embodiment herein.

FIG. 2, with reference to FIG. 1, is a flow diagram illustrating a method of transmitting data packets in a communications network 100 according to an embodiment herein. In step 202, all networking devices 102A, 102B, 106A, 106B in a portion of the communications network 100 are designated as either hubs or spokes. In one embodiment, the networking devices 102A, 102B, 106A, 106B are embodied as routers. The portion of the communications network 100 may include an entirety of the communications network 100. In other words, the network 100 may constitute an entire communications network or merely just one area of a larger communications network. The designation of the networking devices 102A, 102B, 106A, 106B as either hubs or spokes may be performed using one or more of implicit instructions and configured instructions. In other words, the networking devices 102A, 102B, 106A, 106B may be designated as either a hub or spoke based on implicit instructions from a communications designer/engineer or the networking devices 102A, 102B, 106A, 106B may be pre-programmed with computer instructions, which provide for the designation of the type of device (i.e., either hub or spoke) for which it shall be configured. The designation of a particular networking device as either a hub or spoke is communicated to all other networking devices of the communications network 100 through a signaling mechanism. For example, the designation of device 102A as a hub is communicated to all other networking devices 102B, 106A, 106B of the communications network 100 through a signaling mechanism.

In this regard, and in the context of the embodiments herein, the signaling mechanism may use a B-bit if the hub routers 102A, 102B are all Area Border Routers (ABRs) meaning that the hub routers 102A, 102B connect one or more open shortest path first (OSPF) areas to the main backbone network. If the hubs 102A, 102B are not ABRs, the signaling mechanism may define a new bit (e.g., a H-bit) or use an opaque LSA. The signaling is transparent and backwards compatible to the spoke routers 106A, 106B of the communications network 100. In other words, an unmodified router that does not implement the embodiments herein will nevertheless pass the signaling information between routers that do. In step 204, a LSA is communicated by the networking devices 102A, 102B 106A, 106B in the portion of the communications network 100 to each connected hub and spoke. The portion of the communications network 100 may include an OSPF area. The LSA may be a data packet which includes information associated with the current links among the network 100. The LSAs are transferred periodically and/or in the event of a modification to the network topology and updated in a routing database.

At step 206, a shortest path tree (SPT) between a source router and a destination router is computed at all the hubs 102A, 102B and the spokes 106A, 106B based on the LSAs. A routing database in the network routers contains the collection of updated LSA packets received from all the network routers (i.e., networking devices 102A, 102B, 106A, 106B) in the communications network 100. The network routers (i.e., networking devices 102A, 102B, 106A, 106B) use the routing database to compute the SPT. Furthermore, the shortest path tree is truncated at points 104A, 104B at the hubs only for links leading from the spoke 106A to the hub 102A, 102B to determine a shortest data transmission path without any links leading from the spoke 106A to the hub 102A, 102B. In step 208, a routing table (not shown) is created at each of hub routers 102A, 102B and spoke routers 106A, 106B using the truncated shortest path tree. In step 210, the data packets are transmitted from the spoke router 106A, 106B through the shortest path determined in the communications network 100. The transmission of the data packets are controlled by instructions provided in the routing table.

Figure 3:
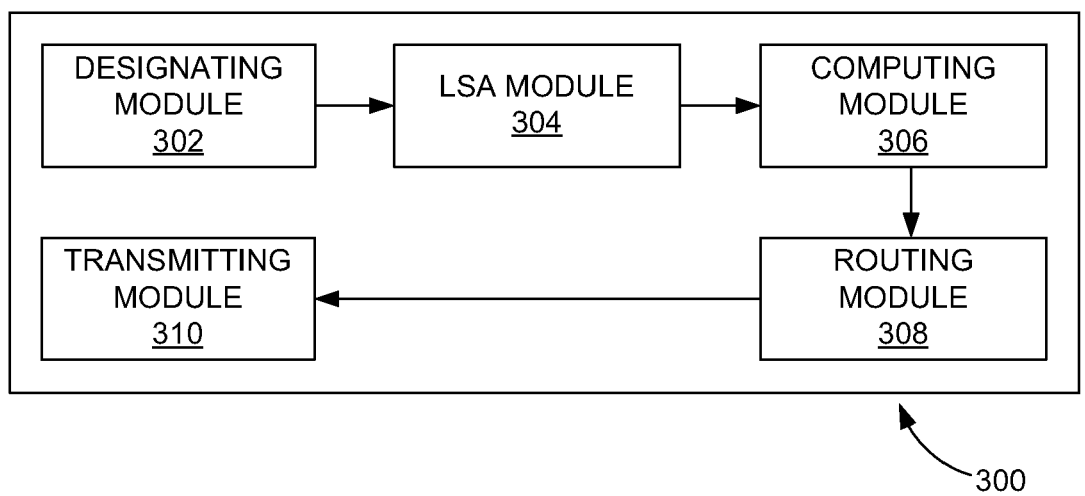
FIG. 3 illustrates a block diagram of software modules according to an embodiment herein.

FIG. 3, with reference to FIGS. 1 and 2, illustrates a block diagram of a computer module 300, which may be embodied as a hardware module or software module or a combination thereof, wherein the software module is encoded in one or more computer-readable media. The module 300 comprises a designating module 302, a LSA module 304, a computing module 306, a routing module 308, and a transmitting module 310 according to an embodiment herein. The designating module 302 designates all networking devices 102A, 102B, 106A, 106B in the communications network 100 as either hubs or spokes. The designation may be performed using one or more of implicit instructions and configured instructions. In a preferred embodiment, the designation of a particular networking device (e.g., a router) as either hub or spoke is communicated to all other networking devices of the communications network by using a B-bit if the hub routers are all ABRs. Otherwise, a new bit (H-bit) is defined if the hubs are not ABRs or an opaque LSA is used. The signaling is transparent and backwards compatible to the spoke routers 106A, 106B of the communications network 100.

The LSA module 304 communicates a LSA to each of the connected hubs 102A, 102B and spokes 106A, 106B in the communications network 100. The LSA may be a data packet which includes information associated with current links among the network routers (i.e., networking devices 102A, 102B, 106A, 106B) and are transferred periodically and/or in the event of a modification to the network topology and updated in a routing database. The LSAs transmitted among the spoke routers 106A, 106B and the hub routers 102A, 102B are used by to build a view of the network topology of the routers (i.e., networking devices 102A, 102B, 106A, 106B) in the communications network 100.

The computing module 306 computes a SPT between a source router and a destination router at all the hubs 102A, 102B and the spokes 106A, 106B based on the LSAs. A routing database in the network routers (i.e., networking devices 102A, 102B, 106A, 106B) contains the collection of updated LSA packets received from all network routers (i.e., networking devices 102A, 102B, 106A, 106B) in the communications network 100. Furthermore, the network routers (i.e., networking devices 102A, 102B, 106A, 106B) use the routing database to compute the SPT. Moreover, the portion of the communications network 100 may include an OSPF area of the communications network 100. Additionally, the SPT may include one or more of hub-to-hub links, hub-to-spoke links, and spoke-to-spoke links.

The computing module 306 further truncates 104A, 104B the shortest path tree at the hubs 102A, 102B only for links leading from the spoke 106A in order to determine a shortest data transmission path without any links leading from the spoke 106A to the hub 102A, 102B. Truncating (at points 104A, 104B) all links leading from the spoke 106A to the hub 102A, 102B in the data transmission routes eliminates the transmission of data through spoke routers 106A, 106B. The routing module 308 creates a routing table at each hub router 102A, 102B and spoke routers 106A, 106B using the truncated SPT. The transmitting module 310 transmits the data packets from the spoke router 106A, 106B through the shortest path determined in the communications network 100.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
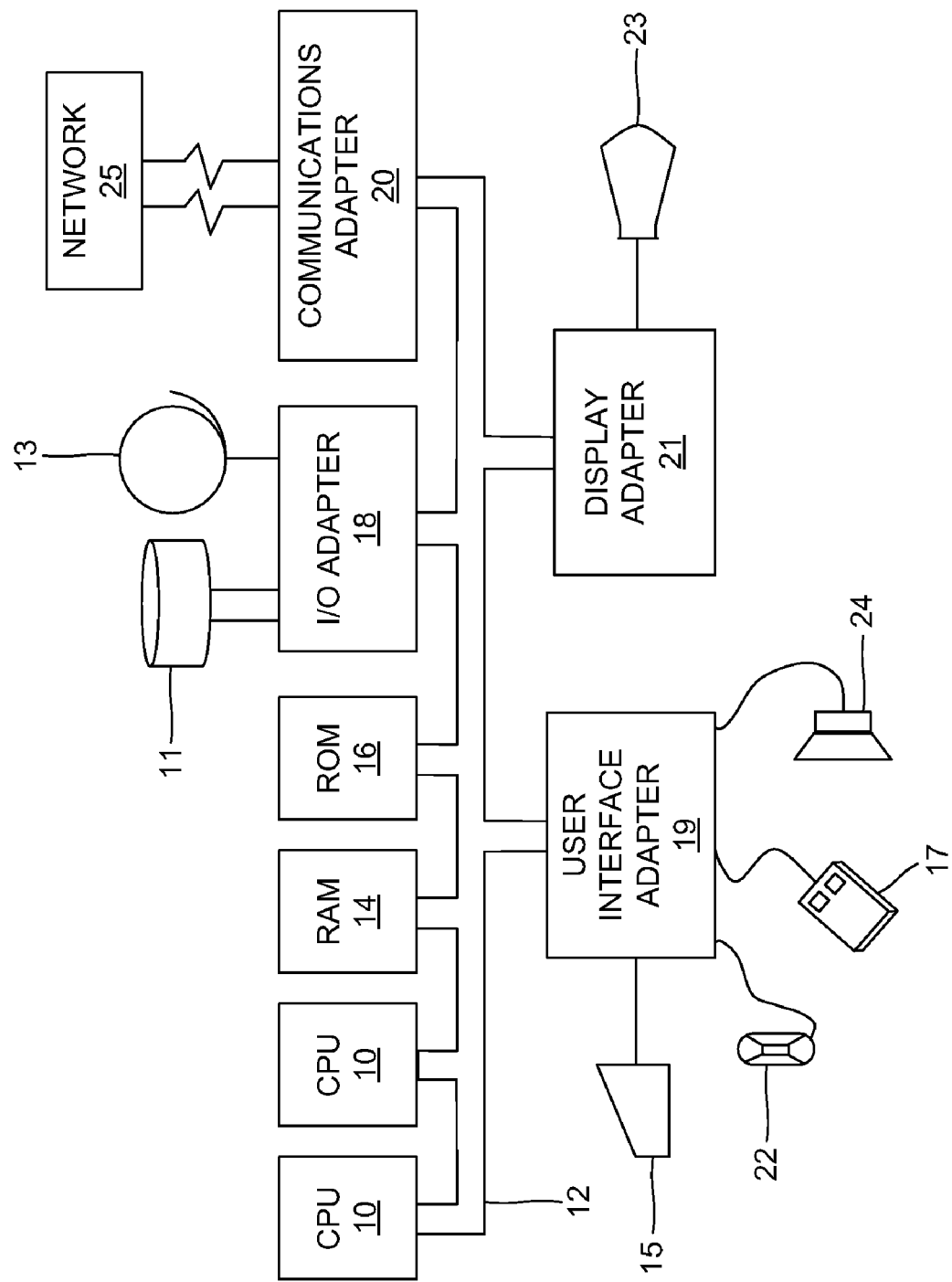
FIG. 4 illustrates a schematic diagram of a computer architecture according to an embodiment herein.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. While the hardware elements described above may be employed, not all elements such as the display device 23, speaker 24, mouse 17, etc. are necessarily needed for the networking devices 102A, 102B, 106A, 106B as used in accordance with the embodiments herein.

The hub and spoke network 100 provided by the embodiments herein prevents undesired transiting of data packets through the spokes 106A, 106B even if no other link exists between the hubs 102A, 102B. In other words, if necessary the hubs 102A, 102B will drop data packets rather than routing them through the spoke routers 106A, 106B. In communications networks 100 with significant redundancy there may be paths via other areas (not shown), which may be used instead. The embodiments herein force these alternate paths to be employed.

Additionally, the embodiments herein provide backwards compatibility and allow transits to other routers located at remote sites. They are transparent to the spokes 106A, 106B, and LSAs need not be modified. In other words, the spokes 106A, 106B can run unmodified OSPF software that is unaware of these alternate paths. Rather, only the hubs 102A, 102B are to be upgraded, and flexible hub-and-spoke topologies are allowed inside the same flooding domain. In other words, the embodiments herein can be applied to topologies more varied and complex than that described herein and illustrated in FIG. 1. For example, a "spoke" 106A, 106B may, in fact, be a small site with multiple interconnected routers. In this case different routers at the spoke site 106A, 106B may connect to the two hubs 102A, 102B. There can also be redundant connections to the hubs 102A, 102B, and more than two hubs 102A, 102B connecting to a site.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method, comprising:
   receiving a first link-state advertisement in a network environment in which a plurality of hub routers and a plurality of spoke routers operate, wherein signaling in the network environment is transparent and backwards compatible to the plurality of the spoke routers, wherein the signaling uses a B-bit if the plurality of hub routers are all area border routers and an opaque link-state advertisement if the plurality of hub routers are not area border routers; and
   computing a shortest path tree based on the first link-state advertisement, wherein said shortest path tree identifies hub router-to-hub router, hub router-to-spoke router, spoke router-to-spoke router, and spoke router-to-hub router link types in the network environment and then eliminates the spoke router-to-hub router link types for provisioning in a routing table, and wherein the shortest path tree is truncated at the hub routers for particular links leading from the spoke routers to the hub routers and not vice versa.

2. The method of claim 1, further comprising:
   transmitting data packets in a communications network based on data in the routing table.

3. The method of claim 1, wherein said hub routers and spoke routers are located in a portion of said communications network.

4. The method of claim 3, wherein said portion of said communications network comprises an open shortest path first area of said communications network.

5. The method of claim 1, further comprising:
   updating the routing table by exchanging link-state advertisement packets between neighboring spoke routers and hub routers.

6. The method of claim 1, further comprising:
   preventing a transmission of data packets through the plurality of spoke routers while routing the data packets among the plurality of hub routers, even if no direction connection exists between the plurality of hub routers.

7. An apparatus, comprising:
   a computing module encoded in non-transitory computer readable media, and configured to:
   compute a shortest path tree based on a first link-state advertisement in a network environment in which a plurality of hub routers and a plurality of spoke routers operate, wherein signaling in the network environment is transparent and backwards compatible to the plurality of the spoke routers, wherein the signaling uses a B-bit if the plurality of hub routers are all area border routers and an opaque link-state advertisement if the plurality of hub routers are not area border routers, wherein said shortest path tree identifies hub router-to-hub router, hub router-to-spoke router, spoke router-to-spoke router, and spoke router-to-hub router link types in the network environment and then eliminates the spoke router-to-hub router link types for provisioning in a routing table that includes the shortest path tree, wherein a same routing table is used by the plurality of hub routers and the plurality of spoke routers to compute the shortest path tree.

8. The apparatus of claim 7, further comprising:
   a transmitting module configured to transmit data packets in a communications network based on data in the routing table.

9. The apparatus of claim 8, wherein said hub routers and spoke routers are located in a portion of said communications network.

10. The apparatus of claim 9, wherein said portion of said communications network comprises an open shortest path first area of said communications network.

11. A method, comprising:
    communicating a first link-state advertisement to hub routers and spoke routers in a portion of a communications network, wherein signaling in the communications network is transparent and backwards compatible to the plurality of the spoke routers, wherein the signaling uses a B-bit if the plurality of hub routers are all area border routers and an opaque link-state advertisement if the plurality of hub routers are not area border routers; and
    computing a shortest path tree at the hub routers and spoke routers based on the first link-state advertisement, wherein said shortest path tree identifies hub router-to-hub router, hub router-to-spoke router, spoke router-to-spoke router, and spoke router-to-hub router link types in the network environment and then eliminates the spoke router-to-hub router link types for provisioning in a routing table.

12. The method of claim 11, wherein data packets are transmitted based on data in the routing table.

13. The method of claim 12, wherein designation of the hub routers and the spoke routers occurs using any of implicit instructions and configured instructions.

14. The method of claim 11, wherein said portion of said communications network comprises an entirety of said communications network.

15. The method of claim 11, wherein said portion of said communications network comprises an open shortest path first area of said communications network.

* * * * *